(No Model.) 3 Sheets—Sheet 1.
W. A. & B. S. H. HARRIS.
AUTOMATIC AIR BRAKE COUPLING.

No. 516,202. Patented Mar. 13, 1894.

(No Model.) 3 Sheets—Sheet 2.
W. A. & B. S. H. HARRIS.
AUTOMATIC AIR BRAKE COUPLING.
No. 516,202. Patented Mar. 13, 1894.
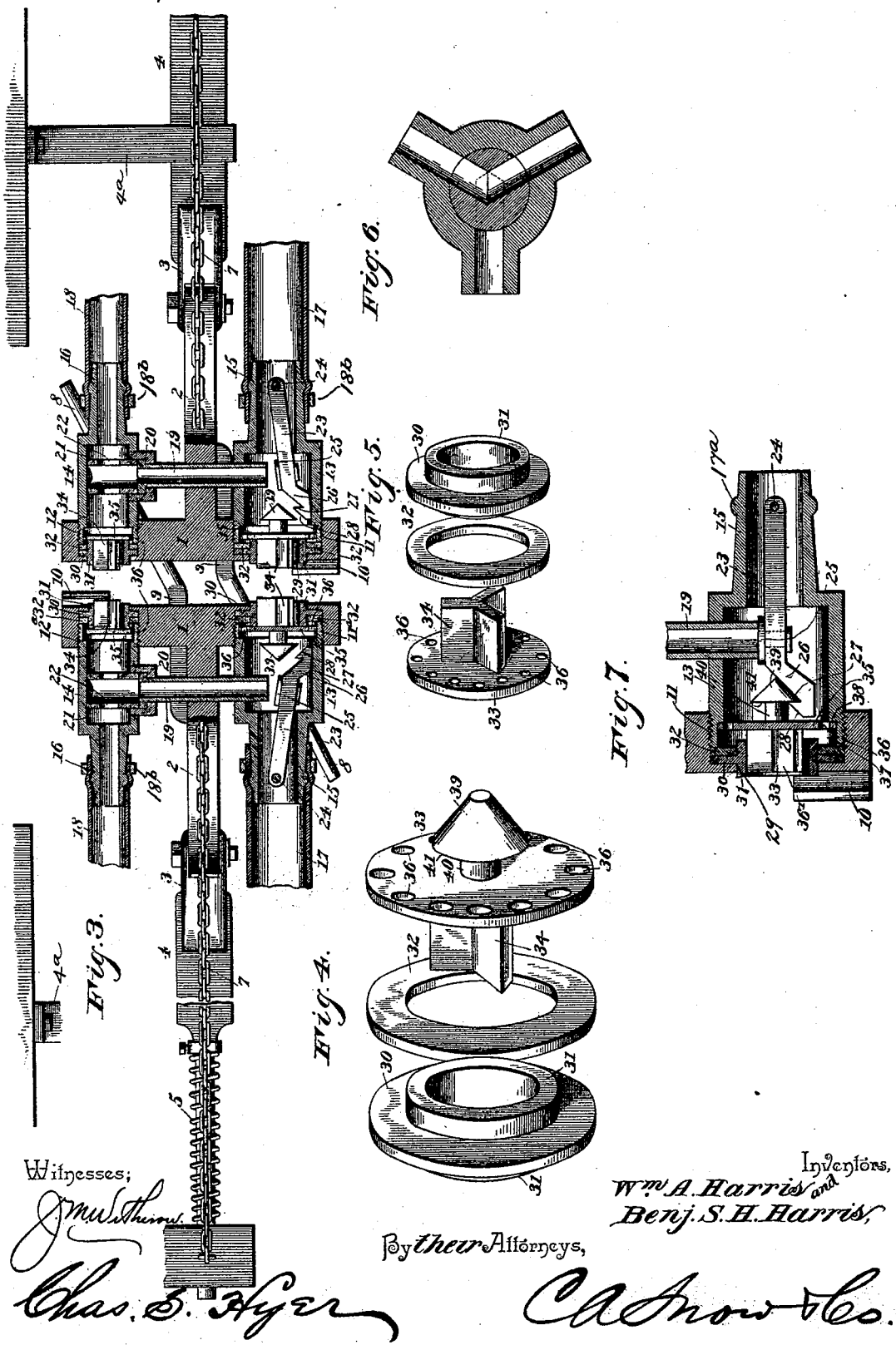
Witnesses:
Inventors,
Wm. A. Harris and
Benj. S. H. Harris,
By their Attorneys, (No Model.) W. A. & B. S. H. HARRIS. 3 Sheets—Sheet 3.
AUTOMATIC AIR BRAKE COUPLING.
No. 516,202. Patented Mar. 13, 1894.

Witnesses:
J. M. Witherow.
W. S. Duvall.

Inventors
Wm. A. Harris &
Benj. S. H. Harris,
By his Attorneys,
C. A. Snow & Co.

UNITED STATES PATENT OFFICE.

WILLIAM A. HARRIS AND BENJAMIN S. H. HARRIS, OF SPARTANBURG, SOUTH CAROLINA, ASSIGNORS OF THREE-FOURTHS TO WHITEFORD S. THOMASON, LOUIS C. CANNON, AND WILLIAM FOWLER, OF SAME PLACE.

AUTOMATIC AIR-BRAKE COUPLING.

SPECIFICATION forming part of Letters Patent No. 516,202, dated March 13, 1894.

Application filed April 30, 1892. Serial No. 431,266. (No model.)

*To all whom it may concern:*

Be it known that we, WILLIAM A. HARRIS and BENJAMIN S. H. HARRIS, citizens of the United States, residing at Spartanburg, in the county of Spartanburg and State of South Carolina, have invented a new and useful Automatic Air-Brake Coupling, of which the following is a specification.

This invention relates to brakes of that class in which the brakes are applied by the escape of fluid, from the brake pipes and the essential features thereof are, first, to produce automatic means for applying the brakes of cars when the same are disconnected; secondly, means for automatically coupling the coupling heads of several cars; and third, to provide means for automatically opening the valves at the coupling of the heads.

With these objects in view the invention consists in certain features of construction hereinafter specified and particularly pointed out in the claims.

Figure 1:
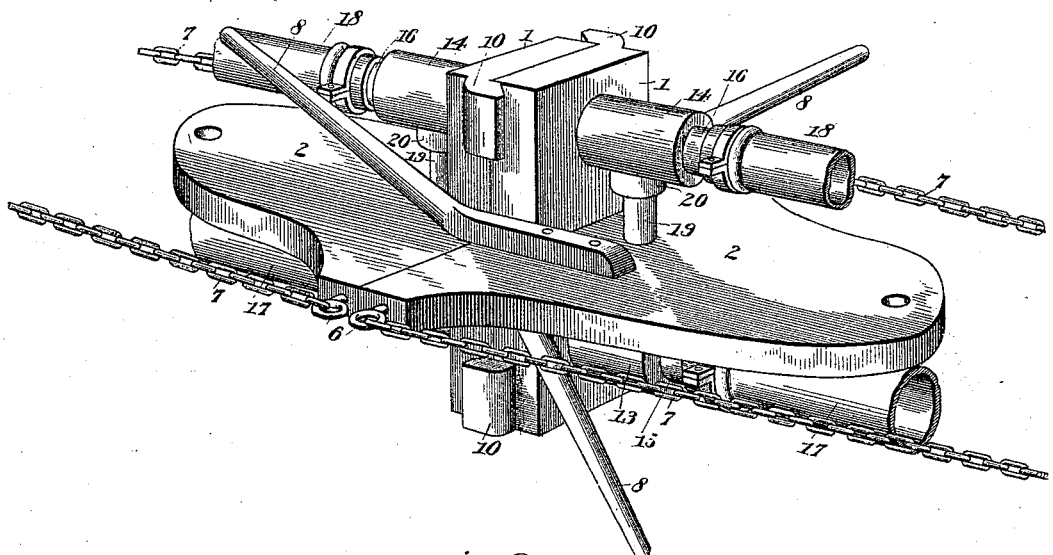
Figure 2:
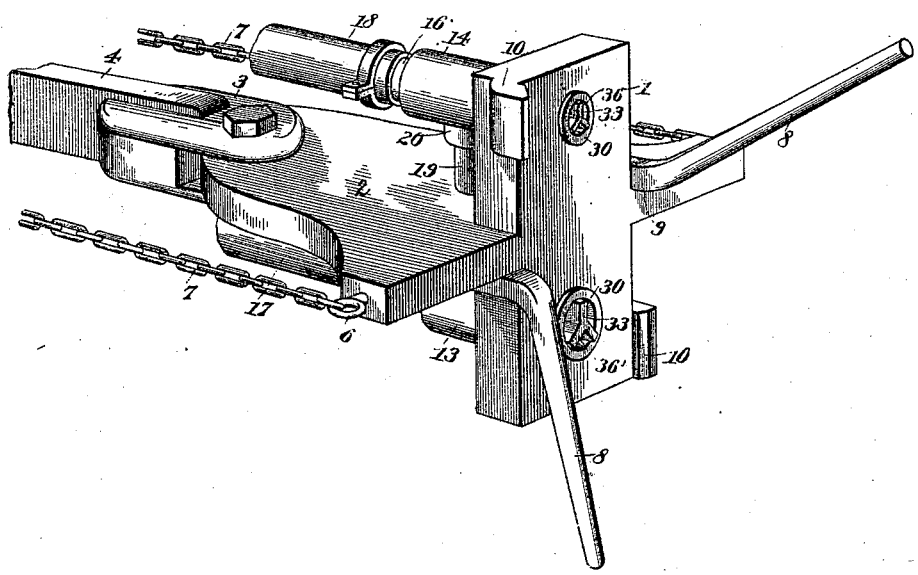
Figure 8:
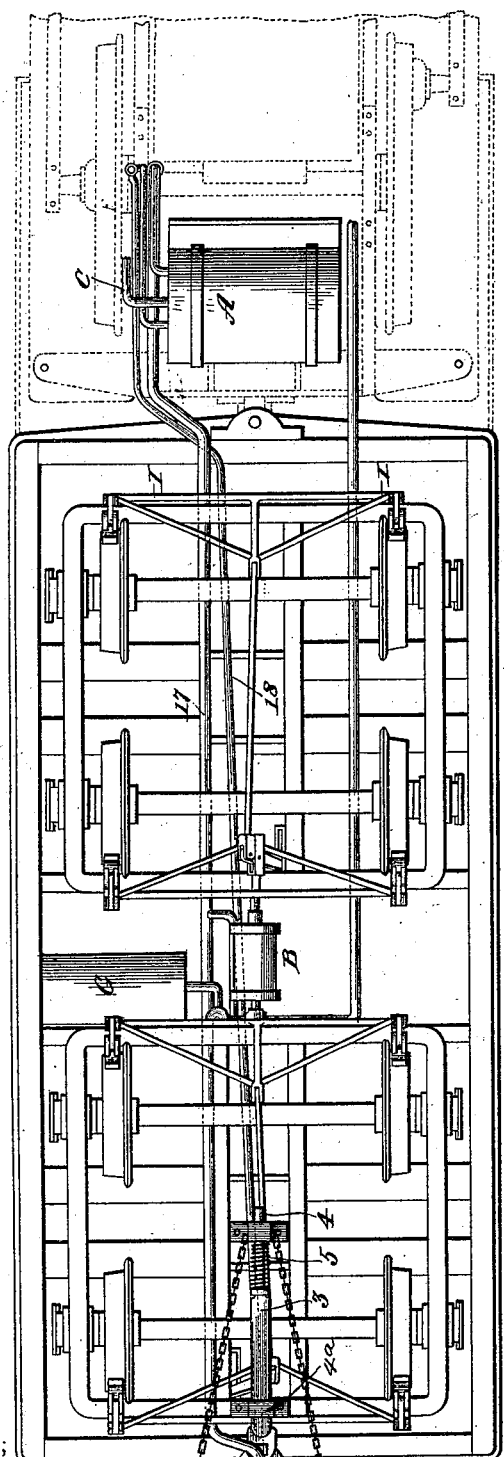
Figure 9:
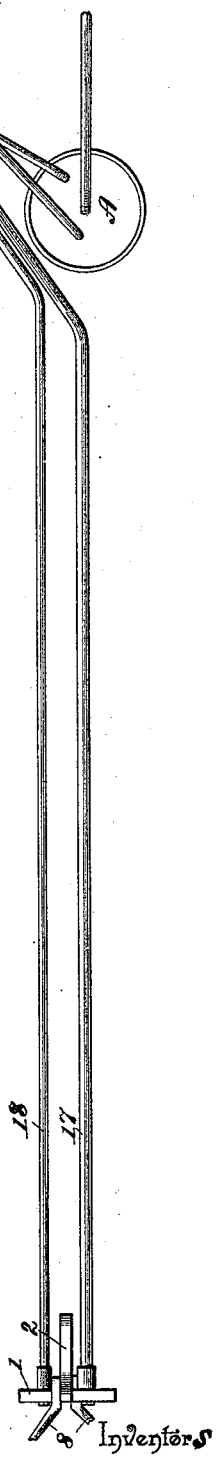

Referring to the drawings:—Figure 1 is a perspective view of two coupling-heads the same being connected, and embodying a portion of our invention. Fig. 2 is a similar view of one of the coupling-heads. Fig. 3 is a longitudinal vertical section of two adjacently-situated coupling-heads, the same being in the act of coming together but not in contact. Fig. 4 is a detail perspective view of that valve employed in connection with the brake-pipe, the component parts being separated. Fig. 5 is a similar view of that valve employed in the equalizer-pipe, the component parts being separated. Fig. 6 is a sectional view of a valve employed in connection with the equalizer-pipe running from the drum, or it may be from the pump. Fig. 7 is a sectional view of the lower half of one of the coupling-heads similar to Fig. 3, the valve being shown locked in an open position, which is the position of said valve when two heads are contacting. Fig. 8 is a bottom plan view of a tender and a portion of an engine, the same illustrating our invention as applied to a Westinghouse-brake-mechanism. Fig. 9 is a side elevation of the system of pipes employed.

Like numerals of reference indicate like parts in all the figures of the drawings.

1 designates the coupling-heads, each having rearwardly and laterally extending flanges or plates 2, the same being horizontally-disposed and at a right angle to the said heads. To the rear ends of the plates 2 are pivoted the front bifurcated ends of bars 4 which extend rearward under the frame of the car and are encircled by coiled springs 5 to thereby give reciprocal movement as well as lateral, to compensate for the movements of the car during travel. To assist in the vertical movement of said coupling-heads suitable stirrups or yokes $4^a$ are provided, as shown in Fig. 3 of the drawings. From the sides of the plates 2 project eye bolts 6 to which are connected chains 7, said chains extending rearward and connected at some distance back on the car-framework. Each of the heads is provided with a pair of arms 8, the same diverging from each other, an arm being arranged on each side of the head and reversely located at top and bottom. The said arms 8 are arranged obliquely and project outward from said heads in upward and downward directions forming flared guides to effect a proper engagement of the heads and guide them to position for the purpose of coupling. A portion of each of the arms 8 extends outward from the flange 2 in a plane parallel therewith and close to the edges of said heads 1 whereby parallel shoulders 9, adapted to serve as guides and cause the heads to be brought into exact alignment, are produced.

The bottom and top portions of opposite edges of the heads 1 above and below the flanges 2 are provided with flanges 10 which take over the unflanged portions of said heads, and hence obviate lateral play of the heads independent of each other.

The upper portion of each of the heads 1 is recessed, as at $12^a$, and the lower portion thereof similarly recessed as at $11^a$ to receive the ends of chambers 14 and 13, respectively, said chambers having their outer external ends threaded in the recesses and their rear ends terminating in reduced nipples 16 and 15, respectively, adapted to receive the ends of rubber hose 18 and 17, said hose being sprung thereover and over the external enlargement or boss $17^a$ formed thereon and maintained in position upon the nipples by means of sliding binding-rings 18ᵇ adapted to clamp the hose against said bosses.

In this form of coupling an equalizer-pipe is added to that commonly employed, each of said pipes in the present instance extending to the drum usually employed under the cab of the engine, or they may extend to the pump, it being understood that this pipe is in addition even when the pneumatic signal-pipe is affixed to the car. The chamber 13 is larger than the chamber 14, as the major portion of the air passes therethrough, and the same may be used independently as in the ordinary form of single pipe fluid brake-mechanism. Each of the chambers 13 and 14 is connected to the other by a union 19, which is simply a tube which extends through the flange or plate 2 of the head 1, the lower end of the tube projecting into the lower chamber, and the upper end of said union being provided with a flange or head and connected by a joint 20 with the lower portion of the chamber 14. In order to thoroughly brace and sustain this union, which is simply a tube, in position, it is connected to a tubular brace 21 having an opening 22 diametrically therethrough. When the union 19 is applied to the chamber 14 it is gradually moved therein by means of the screw-threads of the connecting parts the tubular brace 21 bearing against the upper portion of the chamber 14 and bracing said union 19 against upward movement. Within the chamber 13 there is pivoted, as at 24, in the nipple-portion thereof, a lever 23, the same having at its front end a depressed or inclined neck 26, and in advance thereof a shoulder 27. The lever is provided with a valve disk or head 25, which when said lever is elevated is adapted to contact with and close the lower end of the union 19, thus cutting off communication between the two chambers 13 and 14 through the medium of the said union 19. In each of the recesses 11 and 12 is formed a central opening 29, and the same is of less diameter than the recesses. Rubber bushings 31, which are provided with external flanges seated in the bottom of the recesses in the heads and their axial extensions 31 project in both directions that is into the recesses and beyond the outer faces of the heads, so that when two coupling-heads abut the outer ends of these gaskets will contact and form fluid-tight joints. These bushings 31 are held in position by annular washers 32 fitted thereover at their inner ends and clamped in position by means of the chambers 13 and 14, thereby producing a firm connection of the several parts. The inner flanges 31 project inward into the nipples beyond the inner faces of the washers 32, and are adapted to be engaged by loosely seated valves 33 located in the chambers 13 and 14, and which are provided near their edges with an annular series of ports or perforations 36, whereby an inner or central imperforate portion of greater area than the axial opening in the gaskets is provided.

The outer sides of the valves are provided with winged stems 34, and the same when the valves are closed upon their seats project beyond the outer faces of the coupling-heads, and when two of such stems contact it will be obvious that the valves are forced inward so as to uncover the valve-seats and open up communication between the chambers of the coupling-heads thus connected. The interiors of the chambers are provided with annular reductions near their outer ends so that annular shoulders are produced, against which the valve-disks may abut and through the medium of which the movement of the valves away from their seats is limited.

Referring to Figs. 8 and 9 of the drawings—A designates the main reservoir which receives its charge from the usual pump through the pipe C. G designates the auxiliary reservoir located under each of the coaches. From the drum A, or as before stated, it may be directly from the pump, extends the usual brake-pipe 17, the same, as before stated, being connected to the lower chamber 13 of the coupling-head. The pipe 17 after it leaves the main reservoir extends up into the cab of the engine, where it is provided with a three-way cock or valve F see Fig. 9 by a manipulation of which under the supervision of the engineer the fluid may be directed from the main reservoir into the brake-pipe 17 or cut off therefrom or the brake-pipe may be thrown into communication with the external atmosphere.

18 designates the equalizer-pipe which also leads from the main reservoir or it may be from the pump. This pipe extends up into the cab of the engine and is provided with a three-way valve D shown in Fig. 9 and illustrated in transverse-section in Fig. 6 of the drawings beyond which said pipe 18 is as before stated connected with the chamber 14. By a manipulation of this valve the air may be exhausted from the pipe 18 by throwing the same into communication with the external atmosphere.

Taking the parts in the position shown in Fig. 3, in which a coupling is to be effected the fluid-pressure is turned on in the pipe 17, which it will be seen closes the valves in the lower chambers 13 and the pressure of the fluid as exerted against the valve 25, will cause the valve-levers 23 to elevate and close the valves against the lower ends of said tubes or unions, thus cutting off communications between the chambers 13 and 14 of each coupling-head and bringing the front inclined shoulder of the valve-lever against the conical head 39, which is located upon the inner face of each lower valve disk 33, which head is designated as 39, and by its presence produces in rear thereof a locking-shoulder 41, which is located at the rear end of a stem 40. As the heads come together and a coupling is effected the stems of the valves in both chambers abut, thus forcing the valves away from their seats and opening up communication between the pressure-equalizer-pipes throughout the system and the brake-pipes throughout the system. The rearward movements of the lower valves or those in the chambers 13 cause the shoulders thereof to engage over the shoulders 27 of the valve-levers 25 so that as will be seen the valve-levers being held up by the upward pressure of liquid in the chambers 13 said valves will be locked out of a closed position or away from their seats. Under ordinary circumstances, that is when the train is running, this will be the position they occupy, which position we have shown in Fig. 7 of the drawings. Now it will be seen that if by accident the cars should become separated the valves in the brake-pipes will still be locked against closing and the liquid will be permitted to escape, thus instantly applying the brakes. In shifting cars and making up trains, &c., where it is desired to close the valves in the chambers 13 and in order to accomplish this it is simply necessary for the engineer to manipulate the valve D so as to throw the equalizer-pipe into communication with the reservoir A whereby the pressure in the same, equalizer-pipe, and the brake-pipe are all equalized, and therefore the pressure against the under side and the upper side of the valves 25 in each of the chambers 13 is equal, and the upward pressure is counterbalanced by the addition of the gravitating tendency of the latch or lever so that the latter falls from under the union 19 and serves to unlock the valves by disconnecting at their front ends with the shoulders 41 and permitting them to close so that the brakes are not automatically applied and the cars are free to be shifted. In order to rearrange the parts to effect an automatic application of the brake the three-way valve D is manipulated so as to close that part of the equalizer-pipe 18 between the drum or pump and the valve and to throw the remaining portion of the equalizer-pipe or that portion between the valve D and the coupling-head, into communication with the outer atmosphere, which thus exhausts the surplus of liquid within the equalizer-pipe, and the pressure being re-established in the brake-pipe 17 the same is accomplished.

Certain features of construction herein shown but not claimed and which are novel, form the subject matter of a companion application pending herewith, said application bearing Serial No. 458,511.

Having described our invention, what we claim is—

1. In a brake-system, the combination with a brake pipe, a coupling head having a recess formed in its rear side and said recess having a portion of its wall threaded and its bottom provided with an orifice, of a rubber bushing seated in the bottom of the recess and provided with an intermediate external surrounding gasket, said bushing extending through the orifice and beyond the face of the coupling-head, a washer encircling the rear end of the bushing, a cylinder threaded in the recess and bearing on the washer and connected with the brake-pipe, said cylinder being provided with an internal shoulder in rear of its front end, a valve disk mounted for movement between the shoulder and washer and having perforations near its periphery, and a stem extending from the front face of the valve disk through the orifice and beyond the face of the coupling-head, substantially as specified.

2. In a brake-system, the combination with a coupling-head having a chamber, the bottom of which is provided with an orifice, a cylinder located in the chamber, a brake-pipe connected with the cylinder, a valve mounted in the orifice and provided with a stem extending beyond the face of the head and at its rear end with a shouldered lug, of a tube rising from the cylinder, a pivoted latch arranged in said chamber and provided with a valve disk adapted to close the lower end of the tube, a pipe leading to the upper end of the tube, and communications between the source of fluid supply for the brake-pipe and that of the pipe leading to the tube, substantially as specified.

3. In a brake system, the combination with a coupling-head having a recess, the bottom of which is provided with an orifice, a bushing for the orifice, a cylinder connected with the recess, a valve mounted in the cylinder over the orifice, a stem extending from the valve through and beyond the orifice and surrounded by the bushing, and a brake-pipe leading from the cylinder, of devices located in rear of the valve within the cylinder for locking the valve away from its seat, substantially as specified.

4. In a brake system, the combination with a coupling head having a recess in its rear face, the bottom of which is provided with an orifice, a cylinder connected to the recess, a valve seat surrounded by the orifice, a valve mounted in the cylinder and provided with openings near its periphery, a stem extending from the valve through and beyond the orifice, and a brake pipe leading to the cylinder, of a pressure pipe, means for supplying the same with fluid, and devices operated by the pressure pipe for locking the valve out of contact with its seat, substantially as specified.

5. In a brake system, the combination with a coupling-head having a recess in its rear face, the bottom of which is provided with an orifice, a cylinder connected to the recess, a valve seat in the orifice, a valve mounted in the cylinder and provided with perforations near its periphery opposite the seat, a stem extending from the valve through and beyond the orifice, and a brake-pipe leading to the cylinder, of a pressure pipe, means for supplying the same with fluid, devices operated by the pipe for locking the valve out of contact with the seat, and means for equalizing the pressure of fluid in said pressure pipe with that in the brake-pipe, whereby said devices are released and the valve unlocked, substantially as specified.

6. In a brake-system, the combination with a coupling-head having a valved opening, a brake-pipe leading thereto, a main reservoir for the brake-pipe, of a supplemental pressure pipe leading from the reservoir, a three-way cock located intermediately therein, and a valve locking and unlocking device thrown into locking position by the pressure in the brake pipe and out of locking position by the pressure in the pressure pipe, substantially as specified.

7. In a brake system, the combination with a coupling head having upper and lower recesses each provided with an orifice, valve seats mounted in the recesses, cylinders threaded in the orifices, and valves mounted in the cylinders and provided with stems projecting through and beyond the orifices, the lower valve having a shouldered conical lug at its inner side, of a tube leading from the upper to the lower cylinder, a pivoted latch carrying a valve mounted in the lower cylinder and having a shoulder at its front end adapted to engage in the shouldered lug of the valve when the latter is away from its seat, of a main reservoir, a brake pipe leading therefrom to the lower cylinder, and a pressure equalizing pipe leading from a suitable source of supply to the upper cylinder, substantially as specified.

8. In a brake-system, the combination with a coupling-head having a valve opening and a valve therein, a brake-pipe leading thereto, and a main reservoir for the brake-pipe, of a supplemental pressure pipe leading from the reservoir, a three-way cock located therein, and devices actuated by the pressure in the brake-pipe and adapted to lock the valve out of its seat, substantially as specified.

9. In a brake-system, the coupling head 12 having duplicate chambers 14 and 13, each provided with a valve 35 at the front end, the brake pipe connected to the chamber 13, the pressure pipe 18 connected to the chamber 14, the tube 19 connecting the two chambers, the valve 25 for closing the tube, and locking devices actuated by the movement of the valve 25 in the lower chamber 13 to lock the valve 35, substantially as specified.

In testimony that we claim the foregoing as our own we have hereto affixed our signatures in the presence of two witnesses.

WILLIAM A. HARRIS.
   BENJAMIN S. H. HARRIS.

Witnesses:
 J. T. WOODSIDE,
 T. H. MCELROY.